United States Patent [19]

Kearns et al.

[11] Patent Number: 4,544,870
[45] Date of Patent: Oct. 1, 1985

[54] INTERMITTANT WINDSHIELD WIPER CONTROL SYSTEM WITH IMPROVED MOTOR SPEED CONTROL

[75] Inventors: Robert W. Kearns, 9725 Lookout Pl., Gaitersburg, Md. 20760; Timothy B. Kearns, Gaitersburg, Md.

[73] Assignee: Robert W. Kearns, Gaithersburg, Md.

[21] Appl. No.: 604,640

[22] Filed: Sep. 7, 1982

Related U.S. Application Data

[63] Continuation-in-part of Ser. No. 29,338, Apr. 12, 1979, Pat. No. 4,339,698.

[30] Foreign Application Priority Data

Jul. 12, 1982 [WO] PCT Int'l Appl. .............. PCT/US82/00924

[51] Int. Cl.$^4$ .............................................. H02P 1/04
[52] U.S. Cl. .............................. 318/444; 318/DIG. 2; 15/250 C
[58] Field of Search .............. 318/443, 444, DIG. 2; 15/250 C

[56] References Cited

U.S. PATENT DOCUMENTS

| | | | |
|---|---|---|---|
| 3,351,836 | 11/1967 | Kearns | 318/443 |
| 3,458,889 | 8/1969 | Tann | 318/443 X |
| 3,483,459 | 3/1966 | Kearns | 318/310 |
| 3,532,952 | 10/1970 | Cagnon et al. | 318/466 |
| 3,581,178 | 5/1971 | Kearns | 318/443 |
| 3,582,747 | 6/1971 | Kearns | 318/379 |
| 3,602,790 | 8/1971 | Kearns | 318/443 |
| 3,623,181 | 11/1971 | Bailly | 15/250.02 |
| 3,721,115 | 3/1973 | Kearns | 73/9 |
| 3,728,603 | 4/1973 | Kearns | 318/DIG. 2 X |
| 3,774,091 | 11/1973 | Kearns | 318/443 X |
| 3,876,919 | 4/1975 | Kearns | 318/331 |
| 4,158,159 | 6/1979 | Orris et al. | 318/DIG. 2 X |
| 4,275,477 | 6/1981 | Kato | 318/443 X |
| 4,339,698 | 7/1982 | Kearns | 15/250 C X |
| 4,494,059 | 1/1985 | Kearns | 318/443 |

FOREIGN PATENT DOCUMENTS

| | | | |
|---|---|---|---|
| 2336348 | 1/1975 | Fed. Rep. of Germany | 318/443 |
| 2504799 | 2/1975 | Fed. Rep. of Germany | |
| 2465618 | 4/1981 | France | 318/443 |
| 55-156738 | 12/1980 | Japan | 318/443 |

Primary Examiner—William M. Shoop, Jr.
Assistant Examiner—Bentsu Ro
Attorney, Agent, or Firm—Lane & Aitken

[57] ABSTRACT

In an intermittent windshield wiper system in which the time between wiping cycles depends upon the degree of dryness of the windshield and upon the speed of the wiper blades on the downstroke of the wiping cycle toward the dwell position of the wiper blades, a circuit is provided to regulate the speed of the motor on the down stroke making use of the same transistor device that is used in controlling the energization of the motor to achieve intermittent operation. The motor is a three-brush motor and speed regulation is achieved by deriving signals from one or two of the brushes and applying it to the input electrode of the transistor device. The regulated speed of the motor can be manually controlled to provide a manual adjustment to the sensitivity of the system to the degree of dryness of the windshield. The motor may be electrodynamically braked at the end of each wiping cycle and the electrodynamic braking circuit is also used to apply reverse current to the motor when the windshield wiper system is turned off to drive the windshield wiper blades to a depressed park position.

23 Claims, 14 Drawing Figures

INTERMITTANT WINDSHIELD WIPER CONTROL SYSTEM WITH IMPROVED MOTOR SPEED CONTROL

CROSS REFERENCE TO RELATED APPLICATIONS

This application is a continuation in part of application Ser. No. 29,338 invented by Robert W. Kearns, filed Apr. 12, 1979, now U.S. Pat. No. 4,339,698.

This application also contains some common subject matter with copending application Ser. No. 110,714 of Robert W. Kearns, filed Jan. 9, 1980, now U.S. Pat. No. 4,494,059. This latter patent has an effective filing date of Sept. 11, 1967 by being a continuation of Ser. No. 957,775, Nov. 6, 1978, which is a continuation of Ser. No. 814,000, July 8, 1977, which is a continuation of Ser. No. 565,478, Apr. 7, 1975, which is a continution of Ser. No. 340,557, Mar. 12, 1973, U.S. Pat. No. 3,876,919, which is a division of Ser. No. 487,795, June 8, 1970, U.S. Pat. No. 3,721,115, which is a continuation of Ser. No. 666,703, Sept. 11, 1967.

BACKGROUND OF THE INVENTION

This invention relates to motor control devices for controlling the speed and operation of motors and, more particularly, to a control system for controlling the speed and operation of the motor of a windshield cleaning system of a vehicle.

The overall object of the system of the invention is to improve the safety of vehicle transportation. This object is accomplished with a modest cost of materials, labor and energy. The windshield wipers of the average automotive vehicle in operation today are old, worn and noisy. At the time when the driver is subjected to wet roads and surfaces, he turns on these wipers, which distract, or even mesmerize, the driver, increasing his stress and only partially establishing visability through the windshield.

It is an object of the invention to provide a control device which can be manufactured with solid state integrated circuit technology which is implemented by only a single capacitor. Since the cost of the labor to insert a capacitor in the system exceeds the cost of the capacitor itself, this object achieves a worthwhile design objective.

It is another object of the invention to provide a control device which starts immediately, when turned to on, without an inadvertent delay in wiper operation occurring.

It is a further object of the invention to provide an improved version of a prior development of the applicant. In accordance with the applicant's prior development, a dwell period is provided between the wipe cycles and, as the number of raindrops increase, while remaining insufficient to obscure visability such that intermittent operation is still a reasonable mode of wiper operation, the dwell or pause time will automatically shorten in duration. This achieves less wiper wear and less driver distraction and noise while retaining the capability of continuous wiper operation without input from the driver. This object is enhanced by changing the wiping rate in conjunction with adjusting the dwell time by a single instrument panel knob so the driver can more easily adjust the system to the operating point which meets his need while compensating for variations in vehicle manufacturing, the wearstate of the wiper rubber and contaminants on the windshield surface.

It is a further object of the invention to provide a control device which, by means of the above stated single instrument panel knob, continuously adjusts the dwell time from a maximum to zero while continuously increasing the wiping rate and then to continue to increase the wiping rate without dwell periods to the highspeed low torque capability of today's three brush DC motors, yet improving the speed torque characteristics of the motor performance by obtaining a feedback signal from the motor itself and utilizing this signal in a feedback loop to enhance the motor performance.

It is a further object of the invention to provide a control device which minimizes variation in the position of the wiper during successive pauses by utilizing a solid state switch as a controlled brake and to use this same solid state switch to conduct reverse current through the motor when the wiper motor is turned off.

It is an object of the invention to provide a control device which features depressed and/or off the glass park location of the wiper blades so as not to obstruct the vision of the driver or to interfere with the stream lines of the vehicle when the wiper operation is not required and, further, to drive the wipers to this location at low speed with the full torque capability of the motor while driving the motor in the reverse direction to utilize the mechanical mechanisms developed for this purpose.

It is an object of the invention to provide a control device which achieves this park feature without instantaneously reversing the motor rotation when the instrument panel control is placed in the off position leaving a wet streak on the glass which obscures visability. In accordance with the invention, after the control is placed in the off position, the wipers continue forward wiping the glass clean in the wipe cycle then in progress and upon reaching the on the glass pause position, the motor is reversed and the wipers move to the depressed or off the glass location by means of a single motor driven switch. The achievement of this objective further increases safety and reduces cost which is highly important in high volume products.

It is an object of the invention to solve the problems with a minimum of compatible components to incorporate the above features with the wipe after wash prior development of the applicant.

It is a further object of the invention to provide a control device to regulate the speed of a three brush electric motor under varying load conditions by utilizing two feedback loops from each of two brushes of the motor.

It is a further object of the invention to provide a control device for intermittent operation of a motor wherein the motor is deenergized abruptly at the start of a dwell period and is energized gradually to provide a "soft" start at the end of the dwell period.

It is a further object of the invention to provide a control device which conditions itself automatically during exiting of an acceptable dwell location region to vary the dwell time between wiping cycles in response to the degree of dryness of the windshield.

It is a further object of the invention to provide a control device for intermittent operation of a motor which features an "instant start" upon being energized regardless of the condition of the capacitive component of an RC timing circuit, which object is achieved by open circuiting the capacitor until the intermittent dwell position is traversed during the initial cycle of operation.

It is a further object of the invention to provide a control device for speed regulation of a three brush DC motor wherein a coarse operating motor current is established through the use of one gate of a field effect transistor (FET) and fine variations in that coarse current are established automatically through the use of a second gate on the FET. Other objects and features of novelty of the present invention will be specifically pointed out or will otherwise become apparent when referring, for a better understanding of the invention, to the following description taken in conjunction with the accompanying drawings, wherein:

BRIEF DESCRIPTION OF THE DRAWINGS

FIG. 7a utilizes a transistor to regulate the motor winding current. FIG. 7b utilizes a MOSFET type transistor to regulate the motor winding current. FIG. 7c achieves smother operation of the circuit of FIG. 7b by including a signal filter;

DESCRIPTION OF A PREFERRED EMBODIMENT

Figure 1:
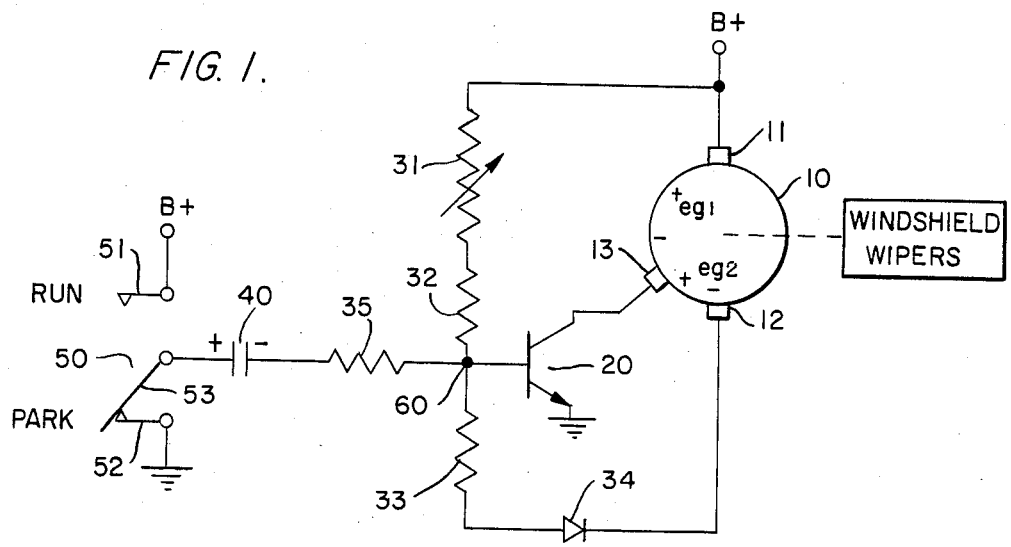
FIG. 1 is a schematic drawing of one embodiment of the invention featuring a method of generating a speed signal within the three brush DC motor to achieve a signal of the correct polarity whose magnitude is proportional to motor rotating speed and used so as to provide an intermittent dwell time adjustment and variable wipe speed. A higher wipe speed corresponding to a shorter dwell time is provided until the dwell time continuously shortens to zero and, upon further adjustment, continuously increases the wiping speed without dwell periods to the maximum capability of motor speed. The single capacitor serves as a system noise filter during wiping, as well.

In the intermittent windshield system shown in FIG. 1, the reference number 10 designates a DC permanent magnet three brush motor connected to drive the windshield wipers on an automotive vehicle through repeating wiping cycles. The motor 10 has a pair of brushes 11 and 12 on opposite sides of the armature and a third brush 13. If the motor 10 were energized between the brushes 11 and 12, it would run at a slower speed than when energized between the brushes 11 and 13. As shown in FIG. 1, the brush 11 is connected to the positive side of the power supply B+. The high speed brush 13 is connected to the collector of a transistor, the emitter of which is grounded. The base of the transistor 20 is connected through a fixed resistor 32 and a variable resistor 31 to the brush 11 and also through a resistor 33 and a diode 34 to the brush 12. As the motor drives the windshield wipers of the automotive vehicle, it also operates a motor driven switch 50. During each wipe cycle, the pole 53 of the motor driven switch 50 will engage the contact 51 which is connected to the positive side of the power supply B+. Each time the motor comes to the end of the wipe cycle with the wiper blades in the "dwell position", the pole of the switch 53 disengages from the contact 51 and engages the contact 52 which is connected to ground. The pole of the switch 53 is connected through the series circuit of a capacitor 40 and a resistor 35 to the base of the transistor 20.

In operation, the circuit shown in FIG. 1 will energize the motor 10 to drive the windshield wipers intermittently stopping for a dwell period at the end of each wipe cycle. At the end of each wipe cycle, the pole 53 of the switch 50 will disengage from the run contact 51 and engage the park contact 52 whereupon the motor 10 will be deenergized and stopped. After a dwell period, the circuit will reenergize the motor 10 to drive the windshield wipers through another wipe cycle. When the wiper blades reach the end of the wipe cycle and the pole 53 disengages from the contact 51 and engages the contact 52, the pole 53 will remain engaged with the contact 52 through a predetermined angle of rotation of the motor 10. This angle of rotation of the motor 10 in which the pole 53 engages the contact 52 is called the $\theta$ region.

In the circuit of FIG. 1, the motor 10 is energized between brushes 11 and 13. The voltage between brushes 11-13 determines the speed of the motor by the equation:

$$E_{11-13} = ir + K\dot{\theta}$$

in which $E_{11-13}$ is the voltage between brushes 11 and 13, i is the current through the armature, r is the resistance of the armature, $\dot{\theta}$ is the speed of rotation of the motor and K is a constant. As the transistor 20 becomes more conductive, $E_{11-13}$ increases and the motor runs faster, for the same torque load.

$$K\dot{\theta} = e_{g1}$$

where $e_{g1}$ is the back emf generated by the rotation of the armaturel. Since the windings associated with the armature angle between brushes 13 and 12 are also turning in the presence of the magnetic field, a voltage $e_{g2}$ is generated by the motor generator configuration between brushes 12 and 13. Thus, brush 12 will be at a lower potential than brush 13 when the armature is rotating. When the transistor 20 is fully conducting the saturation voltage between the collector and emitter of the transistor, $V_{CE(sat)}$, will be quite small and brush 13 will be near ground potential. Under these conditions, the generated voltate at brush 12 will be negative with respect to ground. This negative potential draws current from summing junction 60 tending to reduce the potential at junction 60 and reduce the conductivity of transistor 20. Current enters the summing junction 60 through variable resistance 31 and resistor 32. When the motor driven switch 50 has its pole 53 in contact with the RUN contact 51, charging current flows through capacitor 40 and resistance 35. The windshield wiper system shown in FIG. 1 is moisture sensitive in that when it is raining sufficiently hard, the system of FIG. 1 will not stop for a dwell period, but will skip the dwell period by the motor coasting through the $\theta$ region without stopping. The tendency of the wiper blades to coast through the $\theta$ region is dependent upon the resistance of the windshield to the wiper blades which, in turn, is determined by the wetness of the windshield. Thus, in periods of heavy rain, the system of FIG. 1 will automatically skip the dwell period at the end of each wipe cycle and, thus, is moisture sensitive. On the up stroke of the wipers from the park position, when accumulated moisture is being wiped away, the capacitor 40 does most of its charging, the transistor tends to be more conducting, and the motor runs faster than during the down stroke toward the dwell position. During the down stroke, the almost fully charged capacitor 40 provides only a little current to the summing junction 60 and the speed of the motor is determined by the ratio of variable resistance 31 plus resistor 32 to the value of the resistance 33. During the end of the down stroke and as the blades approach the $\theta$ region, this is even more true. Thus, the circuit achieves the uniform motor speed entering the $\theta$ region needed for good repeatable moisture sensitivity.

As the value of resistance 31 is made smaller, more current flows into the summing junction from this path and the speed into the $\theta$ region is increased. By adjusting the value of the resistor, the point at which the system skips the dwell period can be adjusted. Kinetic energy changes with the square of the speed so large manufacturing variations and changes in rubber hardness and friction properties can be compensated for with only a modest change in detectable wiper speed.

When the motor-driven park switch 50 reaches the dwell position, the positive plate of capacitor 40 changes potential abruptly discharges from B+ to ground. Since a capacitor cannot change its charge instantaneously, the negative plate of capacitor 40 also decreases its potential by B+volts to about −B potential. The summing junction potential at 60 goes negative, turning off the transistor 20 and brushes 13 and 12 rise in potential as the wiper blades slide on the glass using up the kinetic energy. Diode 34 blocks any current from brush 12 from neutralizing the charge on the capacitor 40. If the wiper blades stop for the dwell period, the charge on capacitor 40 is neutralized only by current through resistances 31 plus 32 during the dwell period. As the summing junction potential becomes sufficiently positive, transistor 20 becomes conducting and the motor starts to turn if the torque load is light. Upon exiting the $\theta$ region, the pole of motor-driven park switch contacts contact 51 and capacitor 40 begins to recharge and the cycle repeats.

Resistor 35 is of a sufficiently larger resistance value than resistor 32 so that when the variable resistance 31 is zero, the summing junction remains sufficiently positive throughout the $\theta$ region that the transistor remains conducting continuously and the motor rotates continuously even though the capacitor 40 is charging and discharging each cycle. The transition point at which the system changes from an intermittent operation to continuous operation is with the value of the resistor 31 at about 30 percent of the value of the resistor 32 and the sum of the values of the resistances 31 and 32 will be less than the value of the resistor 35. (The transition point varies with the amount of moisture on the windshield and is the point at which moisture sensitivity occurs.) Ideally, this transition point corresponds with the low speed characteristic of the motor. As resistor 31 is further reduced below the transition point, the potential at brush 12 goes further negative and the motor runs faster. When the collector voltage is driven to $V_{CE(sat)}$, the motor runs at full speed.

Thus, a single variable resistance control adjusts the wiper operation over a continuous range from maximum dwell to zero dwell at gradually increasing wiper speed and then continuously through continuous low speed through continuous high speed.

Figure 2:
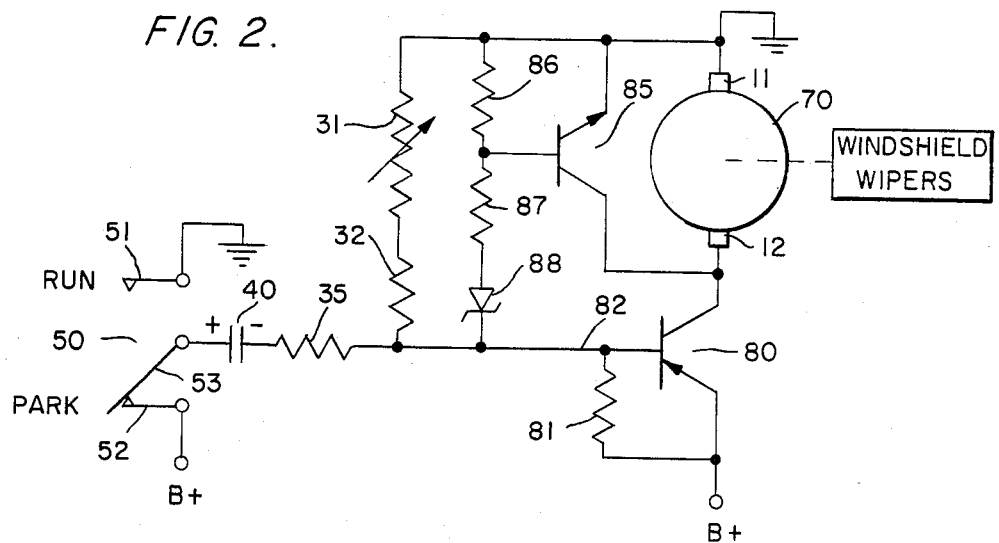
FIG. 2 is a schematic of an embodiment of the invention employing a solid state brake applied to a two brush motor and with only a single capacitor.
Figure 2A:
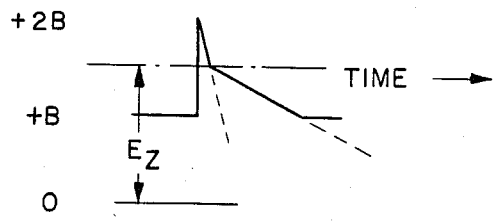
FIG. 2a is a voltage time graph of base voltage on the transistor 80 in the circuit of FIG. 2 showing that the brake utilizes and amplifies current previously stored in the capacitor for a short period at the beginning of the dwell time and the remaining charge is neutralized at a slower rate from a predetermined potential to provide control of the dwell time.

The system of FIG. 2 is a modification of that shown in FIG. 1 employing a two brush permanent magnet motor 70 and employing electrodynamic braking to stop the motor in the $\theta$ region. As in the system of FIG. 1, the motor 70 drives the windshield wipers and drives the motor operated switch 50, the pole 53 of which engages the run contact 51 when the motor is driving the wiper blades through a wipe cycle, and engages the park contact 52 when the wiper blades are in the $\theta$ region. The motor 70 has a brush 11 connected to ground and a brush 12 connected to the collector of a PNP transistor 80, the emitter of which is connected to B+. The base of the transistor 80 is also connected to B+through a resistor 81 and through the series circuit of the resistor 35 and the capacitor 40 to the pole 53 of the motor driven switch 50. The base of the transistor 80 is connected through the series circuit of the potentiometer 31 and the resistor 32 to the brush 11 of the motor 70. A second transistor 85 has its emitter connected to the brush 11 and its collector connected to the brush 12. A series circuit of resistors 86, 87 and a Zener diode 88 is connected from the brush 11 to the base of the transistor 80. The junction between the resistors 86 and 87 is connected to the base of the transistor 85. In the circuit of FIG. 2, the components which correspond to those in FIG. 1 have been given the same reference numbers.

In the circuit of FIG. 2, the motor 70 is energized between brushes 11 and 12. When the transistor 80 is fully conducting $V_{CE(sat)}$, it is quite small and brush 12 is near B+potential. Transistor 80 is fully conducting when its base voltage at junction 82 is sufficiently negative. Base current flows from junction 82 through resistances 32 and 31 to ground and charging current flowing through resistance 35 and capacitor 40 to ground when the pole 53 of the motor driven park switch 50 engages contact 51. The Zener breakdown voltage of diode 88 is selected to exceed B+ so that no current flows through resistance 87 at this time. When the pole 53 engages the contact 52, the negative plate of the capacitor rises in potential by B+volts. Since the charge in a capacitor cannot change instantaneously, the potential of the positive plate rises a like amount to nearly +2B potential exceeding the Zener breakdown voltage. Neutralizing current for the capacitor 40 will then flow through resistance 87 causing transistor 85 to become conductive braking the motor. The nearly +2B potential on the base of transistor 80 will also cause the transistor 80 to be nonconductive deenergizing the motor. With two paths for neutralizing current to flow from the capacitor 40, the exponential decaying curve first occurs with a short time constant until the Zener breakdown point is no longer exceeded whereupon the time constant of the dwell time depends upon the value of resistance 32 and 31 as well as resistance 35. FIG. 2b shows the voltage waveform produced at the junction 82. When the nearly +2B potential at junction 82 decays to less than +B potential, transistor 80 again becomes conductive and the cycle repeats. At the time the junction 82 potential is less than the Zener breakdown potential, the braking transistor 85 is nonconducting, and when the junction 82 potential is less than the Zener breakdown potential and +B, both transistors 85 and 80 are nonconducting. Thus, when transistor 80 again becomes conducting, transistor 85 has previously become nonconducting and the current from transistor 80 energizes the motor 70 efficiently.

Resistor 35 is of a sufficiently larger resistance value than resistor 32 so that when the variable resistance 31 is zero, the junction 82 remains sufficiently less than +B throughout the $\theta$ region that the transistor 80 remains conducting continuously, the motor is energized continuously, and diode 88 remains nonconducting even though the capacitor 40 is charging and discharging each cycle.

Thus, the device of FIG. 2 exhibits intermittent operation with a maximum dwell period when resistance 31 is a maximum and the dwell period is reduced continuously as the value of resistance 31 is reduced. When resistance 31 approaches zero, the dwell periods become truly zero, the braking action is also zero and the motor runs continuously.

Figure 3:
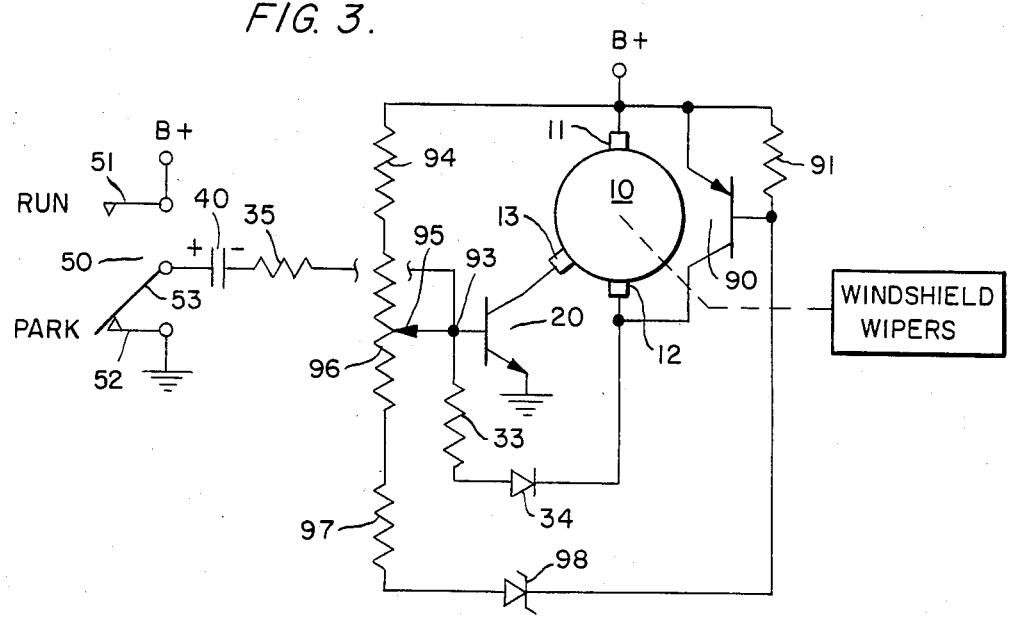
FIG. 3 is a schematic diagram showing a modification of the device of FIG. 1, in which a solid state brake is used.

The intermittent windshield wiper system shown in FIG. 3 employs a three brush permanent magnet motor 10 to drive the windshield wiper system like that of FIG. 1, but also employs electrodynamic braking like the system of FIG. 2. The components in the system of FIG. 3, which correspond to the components of FIG. 1, have been given the same reference numbers and the components of FIG. 3, which correspond to components of the system of FIG. 2, have been given the same reference numbers as in FIG. 2. In the system of FIG. 3, the energization of the motor 10 is between brushes 13 and 11 as controlled by a transistor 20 connected in circuit with resistor 33 and diode 34 in the same manner as described above with reference to FIG. 1. The base of the transistor 20 is connected through the series circuit of capacitor 40 and resistor 35 to the pole 53 of the motor driven switch 50 in the same manner as in the circuits of both FIGS. 1 and 2. The electrodynamic braking transistor 90 has its emitter connected to the brush 11 and its collector connected to the brush 12. The base of the transistor 90 is connected through a resistor 91 to the brush 11 and through a zener diode 98 and a resistor 97 to one side of potentiometer 96. The other side of the potentiometer 96 is connected through a resistor 94 to the brush 11. The movable contact 95 of the potentiometer 96 is connected to a juction 93 which is connected to the base of transistor 20.

The dwell time constant of the system of FIG. 3 is determined by the total resistance of the portion of the resistance of the potentiometer 96 between the wiper 95 and the resistance 94 plus the value of resistance 94. The degree of braking depends upon the value of the resistance between the wiper 95 and resistor 97 plus the value of resistor 97 for a given Zener breakdown voltage. The value of the Zener breakdown voltage exceeds the +B potential as in the circuit of FIG. 2. The summing junction potential at junction 93 goes negative with respect to ground potential as the motor 10 enters the $\theta$ region and the pole 53 engages the contact 52. In this circuit, as the time constant of the dwell period is made shorter, the degree of braking becomes less. As the time constant of the dwell period is made longer, the degree of braking becomes larger. The value of resistance 35 exceeds the value of resistance 94 sufficiently such that when the wiper 95 is moved to the upper end of the potentiometer resistance, the base junction 93 will remain positive throughout the $\theta$ region particularly and throughout the cycle generally so that the motor is energized to operate at high speed with low torque capabilities. At an intermediate position of the wiper 95 on the potentiometer resistance 96, the transition to continuous operation occurs without the transistor 90 braking the motor. Resistor 91 is of sufficiently low value that transistor 90 does not leak above acceptable limits throughout the operating temperature range.

With the wiper 95 at the lower end of the potentiometer resistance, the brake is strong and the dwell time tends to be a maximum. As the wiper moves continuously away from the lower end, the brake becomes continuously less strong and the dwell period less long. At the transition point, the dwell becomes truly zero and the brake action does not occur at all. During these events, the wiper rotation speed has been gradually and continuously increasing. Beyond the transition point, the motor and wiper speed continues to increase to nearly the maximum capability of the motor for the given torque load.

Figure 4:
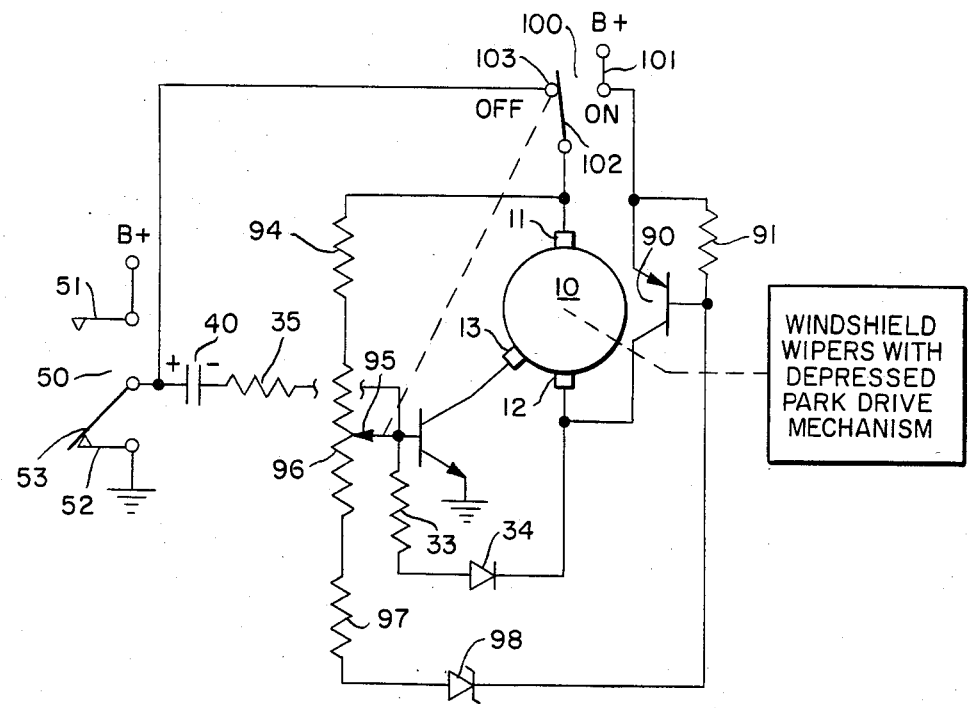
FIG. 4 is a schematic drawing of a modification of the device of FIG. 3, with the additional feature of no-streak off the glass depressed park achieved with a single motor driven park switch.

The intermittent windshield wiper system shown in FIG. 4 is like that shown in FIG. 3, but with an off/on control switch 102 connected with the circuit in a way to continue energization of the motor when the switch is placed in the OFF position until the motor gets to the $\theta$ region and then to energize the motor in a reverse direction to drive the windshield wipers to a depressed park position. When the switch 100 is in the ON position wherein the movable pole 102 engages the contact 101, B+ will be applied to the brush 11 and the circuit shown will operate exactly in the same manner as the circuit of FIG. 3. The components of the system of FIG. 4 corresponding to those of FIG. 3 have been given the same reference numbers. When the switch 100 is moved to the OFF position so that the pole 102 engages the contact 103 in the middle of a wipe cycle, the motor 10 will remain energized by the connection from B+ through the contact 51, the pole 53 of the motor driven switch 50 and the pole 102 of the on/off switch 100 to the brush 11 of the motor 10, the brush 13 being connected to ground through the conducting transistor 20. When the wipers reach the $\theta$ region and the pole 53 is disengaged from the contact 51 and engages the contact 52, the motor 10 will be energized in the reverse direction by ground being applied to the brush 11 through the pole 102 of the switch 100 and the energization of the braking transistor 90, in effect, connecting B+ at contact 101 to the brush 12. When the motor 10 is energized in the reverse direction in the $\theta$ region, the motor will drive the wiper blades to the depressed park position by a conventional depressed park mechanism. When the wiper blades reach the depressed park position, a camming mechanism, described below in connection with FIG. 6, will disengage the contact 53 from the contact 52 deenergizing the motor and causing the wiper blades to stop in the depressed park position. There is no need to brake the motor electrodynamically because the conventional mechanism used to drive the wiper blades to the depressed park position is a worm gear drive which serves as a dynamic mechanical brake to insure stopping in the depressed park position. Even without a worm gear drive, the motor will stop promptly in the depressed park position because of the depressed park load and the fact that the motor will not have had sufficient time nor movement to possess much kinetic energy.

Upon next placing the switch 100 in the ON position, the motor starts normally with the motor-driven switch pole 53 open circuited. The motor continues to drive the wiper blades from the depressed park position and into and through the $\theta$ region while the camming arrangement shown in FIG. 6 and explained below maintains all of the contacts of the motor driven switch 50 disengaged. When the wiper blades move past the $\theta$ region in the commencement of a wipe cycle, the pole 53 of the motor-driven switch 50 will engage the contact 51. The motor then completes the first wipe cycle and parks the blades on the glass at the normal dwell position with the expected dwell time and the process will then repeat as already described.

The control will complete the last cycle in progress regardless of where within the cycle the blades are located when the switch 100 is placed in the OFF position. During this last cycle, the capacitor 40 is again fully charged before the motor is reversed. Under this condition, the motor reverse driving current is a maximum. Naturally, the motor reverse drive occurs even if the last cycle was in the highest speed continuous mode of operation.

In designing the device for some vehicles, it may be desirable to interlock the ON/OFF switch with a particular location of the wiper 95.

Figure 5:
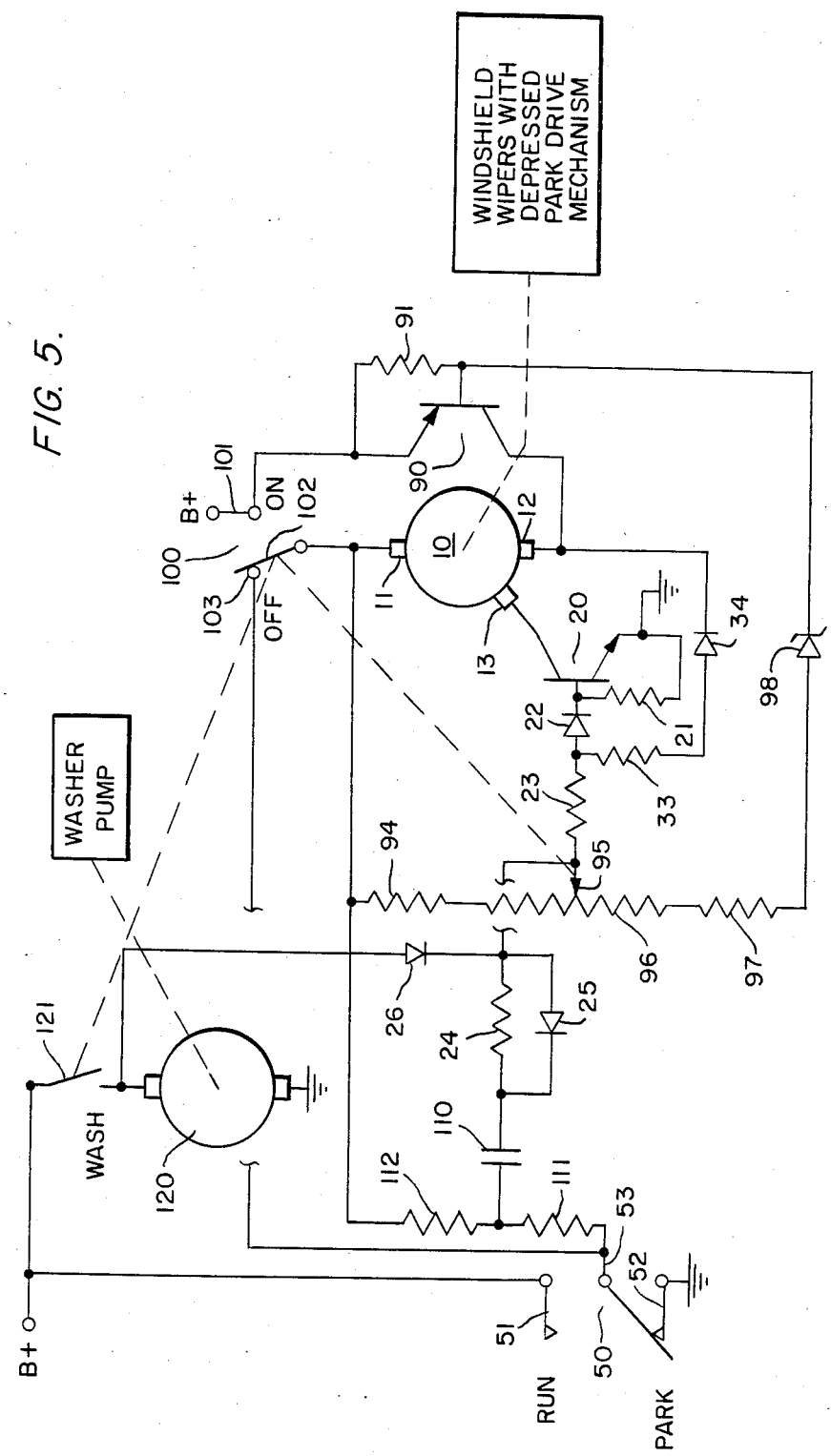
FIG. 5 is a schematic drawing of an embodiment of the invention which features instant start and wipe after wash in addition to the features of FIG. 4.

The intermittent windshield wiper system illustrated in FIG. 5 is like that of FIG. 4, but modified to operate in conjunction with a windshield washing system. In addition, the circuit is modified to provide instant start when the switch 100 is first turned to the ON position. In the circuit of FIG. 5, corresponding components have been given the same reference numbers. In the circuit of FIG. 5, the wiper 95 of the potentiometer 96, instead of being directly connected to the base of the transistor 20, is connected to the base through a series circuit of a resistor 23 and a diode 22. The resistor 33 is connected to the junction between the resistor 23 and the diode 22 instead of being directly connected to the base. In addition, a resistor 21 has been added to directly connect the base of the transistor 20 to ground. A voltage divider comprising a series circuit of resistors 111 and 112 connects the brush 11 of the motor to the pole 53 of the motordriven switch 50. A capacitor 110 and a resistor 24 are connected in series from the junction between the resistors 111 and 112 to the wiper of the potentiometer 96 to provide the RC timing for the circuit. A washer motor 120 is connected to drive a washer pump arranged to squirt washer fluid on the windshield when the washer motor 120 is energized. One side of the washer motor is connected to ground and the other side is connected through a wash switch 121 to B+ supply. The ungrounded side of the wash motor 120 is also connected through a diode 26 to the wiper 95 of the potentiometer 96. A diode 25 is connected in shunt with the resistor 24. The diodes 26 and 25 are poled to permit charging of the capacitor 110 through these diodes when the washer switch 121 is closed. The wash switch 121 is operated by a push button and is closed and remains closed for only as long as the wash button is depressed. The wash switch is interlocked with the off/on switch 100 so that whenever the off/on switch is off and the wash switch 121 is closed, the action of closing the wash switch 121 will move the switch 100 from the off position to the on position. When the wash button is released opening the switch 121, the switch 100 will remain in the ON position.

In the system of FIG. 5, when the switch 100 is placed in the ON position, the voltage at the junction of resistors 111 and 112 rises abruptly. Since the capacitor 110 cannot change its charge instantaneously, the opposite capacitor plate rises the same and current flows through resistor 24, resistor 23, diode 22 into the base of transistor 20. This is in addition to the current flowing through resistor 94 and the potentiometer 96. This additional surge plus a shunt path across capacitor 110 when the switch 100 is in its OFF position, assures an instant start. As in the system of FIG. 4, the park switch pole 53 is open from both RUN contact 51 and PARK contact 52 at start up and remains open from the depressed park position, through the $\theta$ region of the first cycle. Thus, an instant start is further assured. The device of FIG. 5 is designed so during intermittent operation, the voltage at the junction between capacitor 110 and resistor 24 does not go negative with respect to ground below two diode drops. Otherwise, neutralizing current would flow into the capacitor 110 through the wash motor 12 from ground. Diode 22 protects the base of transistor 20 against excessive reverse base emitter voltages. Resistor 21 has a sufficiently low value of resistance so that transistor 20 does not leak above a specified value throughout the temperature operating range. Whenever the wash switch 121 is closed, the washer motor 120 will be energized and operate the washer pump and spray mechanism to squirt cleaning fluid on the windshield. When the wiper of the potentiometer is positioned so that the system is operating in a continuous mode and the wash switch 121 is closed, the potential at the wiper 95 will be nearly +B so the wiper speed approaches the maximum rate. If the wiper 95 is positioned so that the system is operating in the intermittent mode when the wash switch is closed, the wiper speed will approach the same maximum rate. When the pole 53 of the motor driven switch 50 engages the contact 52 in the dwell position, charging current will flow through diode 26, diode 25 into capacitor 110 through resistor 111 to ground. When the pole 53 engages the contact 51 (during a wipe cycle), the potential at the junction between resistors 111 and 112 jumps. The potential at the junction between capacitor 110 and resistor 24 jumps a similar amount and tne capacitor 110 tends to discharge through resistor 24 to near +B potential. But the charging rate is much faster than the discharging rate so in each cycle, the charge on the capacitor 110 increases. The charge on capacitor 110 will maintain a base current flow in the transistor 20 through resistance 24 and resistor 23 for at least one cycle after the wash switch is no longer engaged. Thus, intermittent operation becomes high speed continuous so the windshield is cleaned as quickly as possible while the wash switch is closed and remains in continuous operation for at least one cycle after the wash switch is opened. When the switch 100 is in the OFF position, and the wash button is depressed to close the switch 121, the interlock with the switch 100 will move the switch 100 to the ON position, and the system will operate in the same manner as described above with the switch 100 in the ON position. It is necessary for the switch 100 to be returned to the OFF position manually to turn the system off and return the blades to the depressed and/or off the glass park position following closure of the switch 121.

Figure 6A:
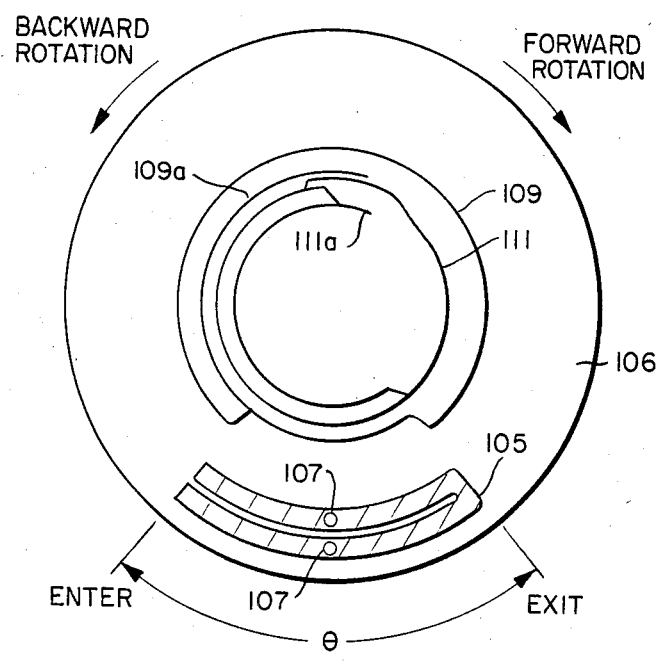
FIG. 6a is a schematic drawing of the output gear of a motor, which may be employed in the embodiments of FIGS. 4 or 5 showing a printed circuit variable resistance provided for moisture sensitivity and a camming arrangement to control the position of the contacts of the motor-driven switch.
Figure 6B:
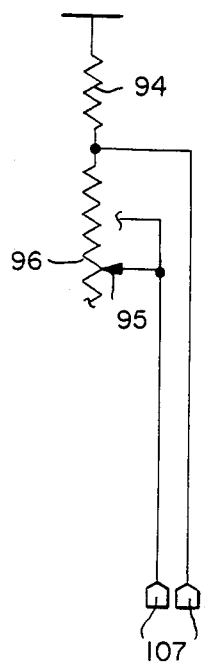
FIG. 6b is a circuit diagram showing how the printed circuit resistance of FIG. 6a is connected to the circuits of FIGS. 3 or 4.

The system of FIGS. 4 and 5 can be modified to provide moisture variable dwell time, as shown in FIGS. 6a and 6b, by means of a resistance film 105 mounted so as to rotate with the output gear 106 of the motor 10, which gear makes one 360 degree rotation for each wipe cycle.

The resistance film 105 is shaped to lie along two adjacent concentric, arcuate paths on the output gear 106 and are joined together at one end. The two arcuate arms of the thin film resistor 105 are engaged by brushes 107 whenever the wiper blades are in the θ region. The arcuate length of the resistor 105 thus corresponds to the angular resistor 105 thus corresponds to the angular position of the θ region with the respect to the brushes 107. One of the brushes 107 is connected to the wiper 95 of the potentiometer 96, as shown in FIG. 6b, and the other brush 107 is connected to the junction between the potentiometer 96 and the resistor 94. Thus, the thin film resistor 105 shunts the portion of the potentiometer 96 between the wiper 95 and the junction of the potentiometer with the resistor 94. Since, in the system of FIGS. 4 and 5, the dwell time depends upon the value of the resistance 24, the resistance 94 and the resistance between the wiper arm 95 and the upper end of the potentiometer, the dwell period will depend upon the resistance of the thin film resistor 105 between the brushes 107, which, in turn, depends upon the final resting position of the wiper blades in the θ region. The further the wiper blades slide into the θ region in a wipe cycle, the closer the brushes 107 will come to the end where they are joined together and the smaller will be the value of the shunt resistance provided by the thin film reistor 105 in the circuit. When the amount of rainfall is light, the brushes 107 will only slide a relatively small distance into the θ region before the motor stops and the dwell period, accordingly, will be long. When the rainfall is heavier, the resistance of the wiper blades on the glass will be less and the wiper blades will slide further into the θ region making the value of the resistance provided by the film resistor 105 less and reducing the time of the dwell period. When rain becomes relatively heavy, the brushes 107 will slide far enough to make the resistance small enough to cause the dwell period to be skipped entirely.

The systems of FIGS. 1, 2 and 3 may be modified in a similar manner to provide a dwell period which is variable in accordance with moisture conditions.

The camming mechanism for positioning the contacts of the motor driven switch for the systems of FIGS. 4 and 5 is shown in FIG. 6a. The pole 53 of the motor driven switch 50 is flexible and is positioned by a guide riding in a groove 109 in tne output gear 106 of the motor 10, as shown in FIG. 6a. The park contact 52 is also flexible and is positioned by a guide riding in a groove 111 in the output gear 106. Both the flexible pole 53 and the park contact 52 are mechanically biased to press inwardly toward the center of rotation of the output gear shown in FIG. 6a. During continuous and intermittent operation, while the motor is moving forward, the groove 111 is shaped to maintain the guide for the contact 52 in the outer portion of the groove 111. Similarly, the groove 109 is shaped to maintain the guide for the pole 53 in the outer portion of the groove 109. In the θ region, the pole 53 will be moved by the groove 109 to engage the contact 52 and, outside the θ region, the contact 53 will be moved to engage the contact 51 by the groove 109, while the motor is moving in the forward direction.

When the instrument control panel switch 100 is placed in the OFF position, the wipers continue to move forward completing the last cycle. After entering the θ region, the flexible pole 53 touches the flexible PARK contact 52 and the motor reverses direction as has been described.

Since the flexible contact 53 is biased toward the center of rotation, upon the motor reversing rotation, the contact 53 will follow the inner part 109a of the groove 109. The pole 53 will continue to engage the contact 52 for approximately 180 degrees. During this 180° reverse rotation, the depressed park mechanism in the wiper linkage operates to move the wiper blades to a depressed park position, which may be off the windshield. After about 180° of reverse rotation, the contact 52, due to the inward radial bias, is guided into the inner part 111a of the groove 111. As contact 52 is guided into the inner part 111a of the groove 111, the contact 52 is disengaged from the pole 53, thereby de-energizing the motor and circuit. Since the wiper blades have only turned a half rotation in reverse and are experiencing a high load torque, the small energy of the system is rapidly dissipated and the blades come to rest with little further rotation since the entire system is de-energized.

Upon the next occasion that the instrument panel control switch 100 is placed in the ON position, the circuit is energized, the motor rotates in the forward direction. Due to the inward radial bias, contact 52 is guided to remain in the inner part of groove 111 until the motor has moved through and past the θ region. The flexible PARK contact 52 thus remains disengaged from the flexible pole 53 during the first 180° of forward rotation until the wiper blades exit from the θ region of the first cycle. At this point, the flexible pole 53 touches the stationary RUN contact 51, and the operation continues as has already been described.

The advantages of the invention can be better understood by considering the operation of the systems of FIG. 4 or FIG. 5 under three conditions:

(1) Constant potentiometer wiper, 95, position with changing weather conditions,
(2) Constant weather conditions with a change in the potentiometer wiper 95 position, and
(3) The wiper blades have become older, harder, and worn.

Assume the road surface is wet, the windshield is dry, and, while the vehicle is approaching a truck, but still far enough behind it, that the windshield remains dry. The potentiometer wiper 95, is located such that the dwell time is approximately 15 seconds between one second wipe cycles. The kinetic energy of the system is dissipated in work done by the blades sliding a short distance into the θ region plus the energy consumed in the controlled brake. During each wiping cycle movement, the film resistance 105 is open circuited so the system kinetic energy, upon entering the θ region, depends upon the position of the potentiometer wiper 95. As the truck is approached, the spray increases so the value of the film resistance 105 in the circuit during the dwell periods becomes less. The less the value of the film resistance becomes, the less negative the summing junction potential at the wiper 95 will become and the less the braking will be, and the shorter will be the dwell time. When the vehicle gets to the truck preparing to pass, the spray will be dense, the sliding film resistance value in the circuit will be quite low at the stopping point in the θ region, no brake will be applied, and the wipers will operate continuously. After passing the truck, the sliding film resistance value will again be high, the degree of braking will be high, and the dwell time will return to 15 seconds in a few cycles. Thus, when the windshield is dry, the weather conditions effect on the windshield are sampled every 15 seconds. As the slipperiness of the windshield increases, the condition of the windshield is sampled more frequently. As the vehicle gets in position to pass the truck, the condition of the windshield is sampled every second. Thus, the sampling rate changes in the desired direction.

Now, assume the dwell time is 7 seconds with a one second wipe cycle, but the driver feels his vision is too obscured. He moves potentiometer wiper 95 further toward resistor 94 sufficiently to increase the wiper speed 5 percent. The amount of moisture accumulated in the sample is reduced 5 percent during the up stroke, but upon entering the θ region, the kinetic energy is increased 10 percent. The wipers slide further into the θ region, raising the summing junction voltage which decreases the amount of braking and reduces the dwell time to 4 seconds, for example. The driver's objective has been achieved.

Now assume the wiper blades have become older, harder, worn blades. The main effect of this aging and wearing will be less friction coefficient between the blades and the windshield. Accordingly, the blades will slide further into the θ region and a shorter dwell time will be the result. By moving potentiometer wiper 95 toward the resistor 97, the speed of the wipers will be reduced, the moisture sampled increased, the kinetic energy decreased and the braking increased to compensate for the aged and worn condition of the brakes.

Figure 7A:
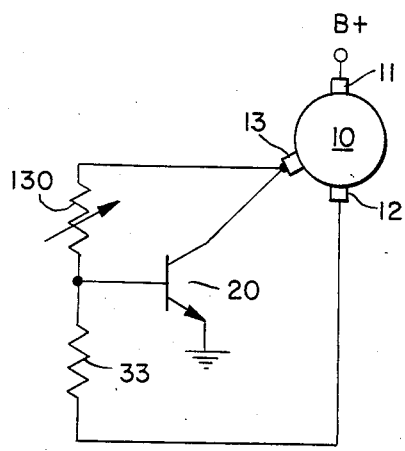
FIGS. 7a, 7b and 7c are circuit diagrams showing different embodiments of the motor speed regulator of the present invention.

The same potentiometer wiper 95 adjustment compensates for variations in the +B voltage, speed torque characteristic variations in the motor, component tolerances, and friction in the linkages. The intermittent windshield wiper systems of FIGS. 1, 3, 4 and 5 energize the motor with a circuit which maintains the speed of the motor constant during the down stroke for varying torques utilizing the three brushes of the motor to achieve the constant speed characteristic. FIG. 7a is a simplified circuit diagram of an improved speed regulation current to achieve the constant speed characteristic. As shown in FIG. 7a, driving current flows from brush 11 through the armature windings to brush 13 with the majority of the current flowing through transistor 20 to ground. A small portion flows from brush 13 through potentiometer 130, from which an even lesser amount flows into the base of transistor 20 to ground. The remainder of the current from potentiometer 130 flows through resistor 33 and brush 12 into the motor armature where the motor EMF, produced by the armature rotation in the presence of the magnetic field, raises the potential of this current to brush 13, from which it flows through the transistor 20 to ground. The ratio of the value of the resistance of potentiometer 130 to the value of resistor 33 and the properties of the motor establishes a preset speed for the motor. If the torque load on the motor should increase tending to cause a decrease in speed, the potential at brush 13 will rise and the potential at brush 12 will rise nearly an equal amount. The base voltage of the transistor will remain at about 0.7 volts. Accordingly, more current will flow through potentiometer 130 than before while less current will flow through resistor 33. Thus, base current is increased from two feedback loops (1) from the increased current flow through potentiometer 130, and (2) due to the decreased current flow through resistor 33. After the transient conditions become stable, the voltage generated between brushes 13 and 12 will again dominate the control of current into the base of transistor 20. This voltage is less effective by ir drop than is the voltage between brushes 11 and 13 and is a better measure of the motor speed. Should the torque load be suddenly decreased, the motor speed will tend to increase, decreasing the potential at brush 13 and further decreasing (causing to be more negative) the potential at brush 12. Base current will be decreased from the two feedback loops. Less current flows through potentiometer 130 decreasing the base current, while more current flows through resistor 33 further depriving transistor 20 of base current.

Figure 7B:
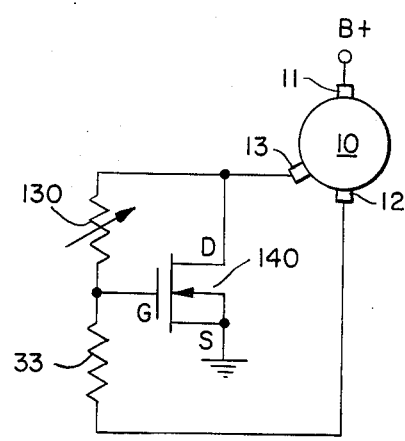

FIG. 7b shows a speed control circuit similar to that of FIG. 7a with field effect transistor 140 replacing the transistor 20. There are two advantages of the use of a field-effect transistor over a transistor. A transistor has a lower limit on how close the voltage at brush 13 can approach ground. For a transistor, this voltage is around one volt ($V_{CE(sat.)} = 1$ V.). Also, current flows into the base. In a MOSFET (metaloxide semiconductor field-effect transistor), the conducting path is that of a resistor whose value depends upon the channel width. By paralleling MOSFETs, any channel width and, hence, any value of low resistance is possible. A MOSFET manufactured by General Electric of Schenectady, N.Y., which has a maximum current capability of 30 amperes, has an $R_{ON}$ value of 0.008 ohms. Thus, the voltage at brush 13 can approach within ¼ volt of ground. In a typical windshield wiper motor, the maximum current is 8 amperes, so the voltage at brush 13 could approach 1/16 volt in that application. The second advantage is that the gate (base) operates on voltages (no current flows into the gate). Thus, very high gains within the MOSFET can be achieved so the least change in speed will be corrected by the circuit.

Figure 7C:
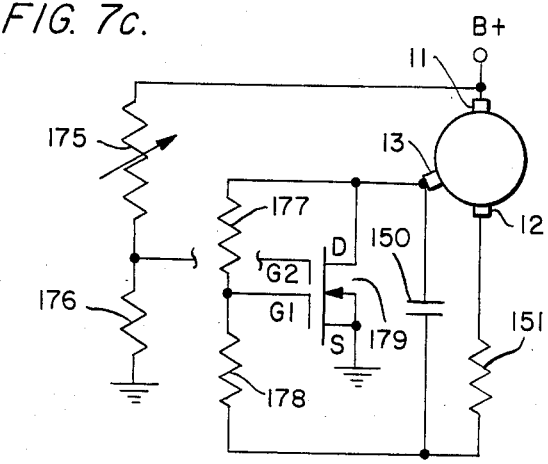

FIG. 7c shows a modification of the speed control circuit of FIG. 7b in which a dual gate enhancement field effect transistor 179 has been substituted for the field effect transistor 140 and a filter circuit comprising a capacitor 150 and resistor 151 have been added. In the circuit of FIG. 7c, the brush 11 is connected to ground through a variable resistor 175 and resistor 176 connected in series and the junction between the variable resistor 175 and the resistor 176 is connected to a gate G2 of the field effect transistor 179 to establish a coarse operating FET current. The brush 13 is connected to the drain of the transistor 179 and the source thereof is connected to ground. The brush 13 is also connected through a resistor 177 to the gate G1 of the transistor 179, which, in turn, is connected by the series circuit of resistors 178 and 151 to the brush 12 of the motor 10. The brush 13 is connected through the capacitor 150 to the junction between the resistor 178 and the resistor 151.

The voltage waveform at brush 12 of the circuit of FIG. 7c is not pure DC. Rather, it is DC with a pulsing AC superimposed. Thus, filtering is desirable. It is important that the filter present to the gate of the FET a measure of the average. The purpose of resistor 151 is to slow the charging of filter capacitor 150 due to the AC pulsing. If the capacitor should charge in accordance with the pulse magnitude, the speed signal would be lost, because the pulse amplitude tends to be the same value at all speeds. By returning the other side of the filter capacitor to brush 13, the filter output is made a better representation of the voltage output being generated between brushes 13 and 12.

Field-effect transistors are assigned their name because the current flow in them is controlled by varying the electric field which is brought about through the application of a voltage that controls the electrode known as the gate. The field effect transistor used in the circuit of FIG. 7c is a dual gate enhancement mode field-effect transistor (FET). Enhancement mode FETs are those which have no current flow with zero gate voltage. Variable resistance 175 with resistor 176 establishes a potential on gate G2, which establishes a coarse operating FET current, while the potential at gate G1 depends upon the motor dynamics as previously described, to provide control of variations in motor speed about that operating current.

Figure 8:
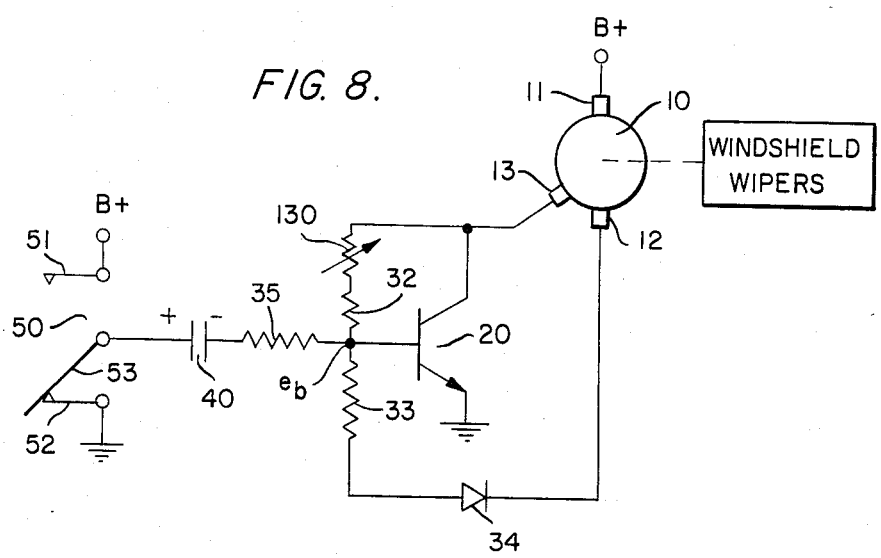
FIG. 8 is a circuit diagram of an intermittent motor control system in accordance with the present invention utilizing the speed regulation of FIG. 7 and achieving a "soft" start after a dwell time occurs.

In the embodiment of FIG. 8, the speed control of FIG. 7a is used in an intermittent circuit similar to FIG. 1. In the circuit of FIG. 8, the speed control circuit of FIG. 7a has been connected to the three brush motor 10 in the same manner as in FIG. 7a with a diode 34 connected in series with the resistor 33 to permit current flow from the base of the transistor to the brush 12 and with a resistor 32 connected in series with the variable resistor 130. In addition, to make the circuit intermittent, the base of the transistor 20 is connected by a series circuit of resistor 35 and a capacitor 40 to the pole 53 of the motor driven switch 50 having contacts 51 and 52 connected to B+ and ground in the same manner as the motor driven switch 50 in the circuit of FIG. 1. In this embodiment, a different result is obtained in that after the dwell, the system starts "softly" compared to prior art systems, such as disclosed in the applicant's prior U.S. Pat. No. 3,351,836. In the system of the applicant's prior patent, the transistor switches to full ON rapidly and the transistor is in saturation driving the motor with full torque. As stated above, windshield wiper systems are notoriously noisy. They include many individual linkage members which are loosely coupled. When such a system coasts to a stop, the loose couplings tend to separate. Upon conducting full saturation current in the motor windings, full torque capability occurs which accelerates first the motor, then each part in turn as the play is removed. Further, the members currently being driven accelerate while another loose coupling is traversed and then the assembly smashes into the next component where this system now accelerates through the next loose coupling and smashes into the next member. The result is a noisy "hard" start.

Figure 8A:
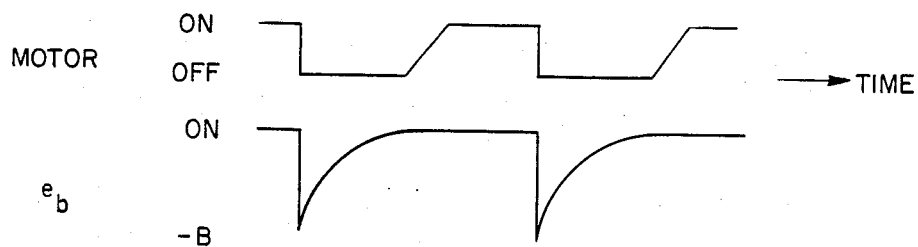
FIG. 8a shows voltage time waveforms generated in the circuit of FIG. 8.

FIG. 8a shows waveforms produced by the system of FIG. 1 as the system operates through successive wipe cycles. The lower waveform illustrates the waveform produced at the base of the transistor 20 and the upper waveform illustrates the waveform produced at the collector of the transistor 20 or, in other words, at the brush 13. As the base voltage of the transistor 20 rises through ground and becomes positive, there is a tendency for the collector voltage to switch on as in the system of the U.S. Pat. No. 3,351,836. But, as the collector voltage drops, the current through potentiometer 130 will decrease, which tends to turn the transistor 20 off. The result is that base equalibrium must be re-established during start-up so that the motor starts gradually or "softly". In a "soft" start, the voltage across the armature is increased over finite time with a controlled rate of increase such that the backlash between system components are closed consecutively and slowly relative to prior art systems and with much less sound noise. As shown in FIG. 8a, motor experiences a sudden de-energization upon entry into the θ region, where the components glide to a stop. At the end of the dwell period, the voltage across the armature has a slope and increases at a controlled rate to achieve the above described result.

In the intermittent system described above, it should be noted that both the circuitry and the motor are effectively de-energized at the start of a dwell period. Changing the kinetic energy of the system into work on the windshield done by the wiper occurs under these de-energized conditions. In the systems with dwell periods varying with the amount of moisture, the value of sliding resistance plus a fully charged capacitor determines the dwell period. In these systems, the dwell period depends upon the preceding wiping cycle experience. Also, in the above described intermittent system, the charging of the capacitor overrides the speed control during the up stroke of the wipers. This action does not interfere with the establishment of a uniform kinetic energy upon entering the θ region at the bottom of the down stroke.

Figure 9:
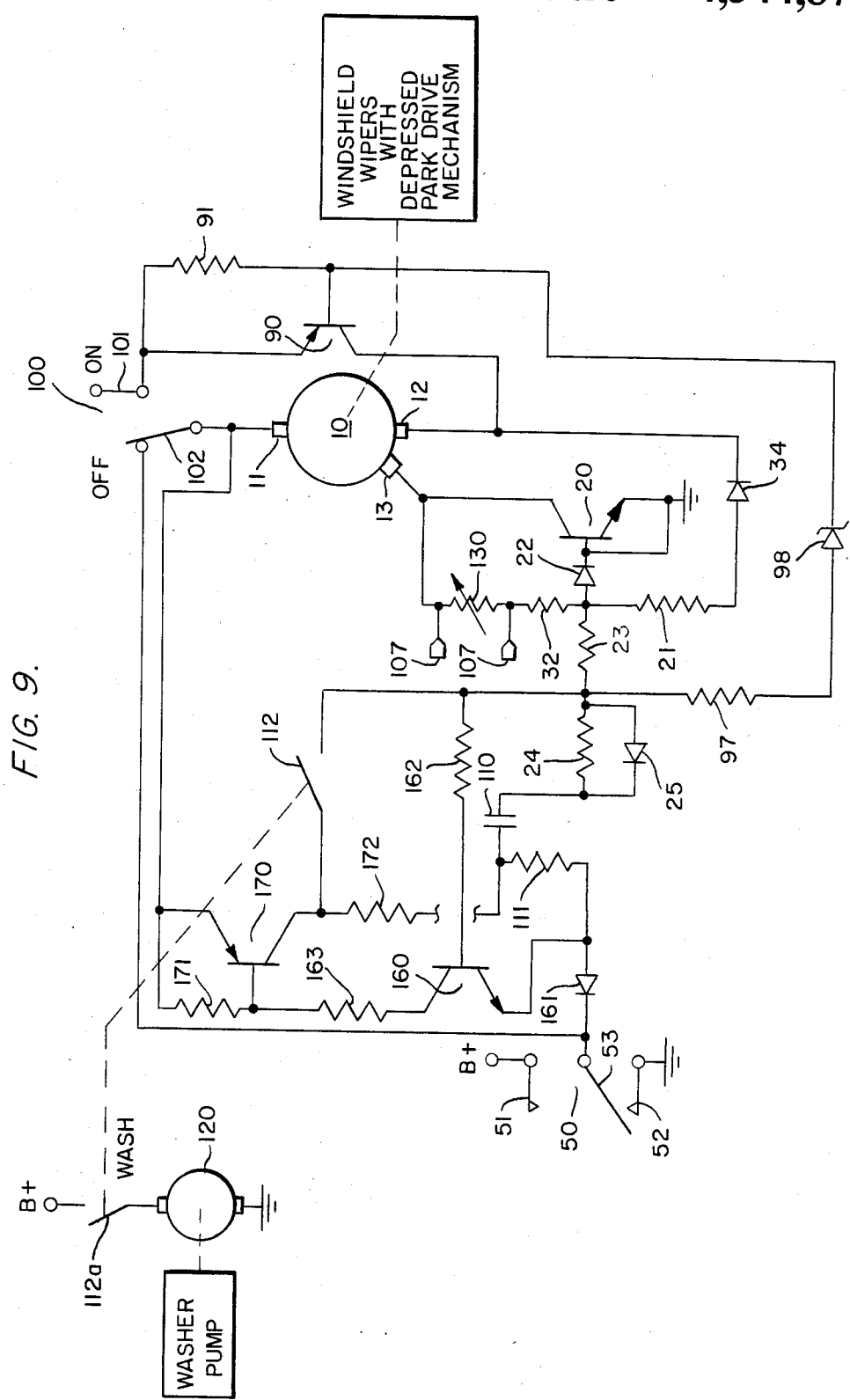
FIG. 9 shows a circuit diagram of an embodiment of the invention derived to achieve many of the features of the other disclosed embodiments in a single control.

The system of FIG. 9 achieves a more uniform wiping speed in both the up stroke and down stroke trajectories. The system also provides a "soft" start. The resistance in the RC circuit remains constant while the charge on the capacitor varies with the degree of dryness of the windshield. The length of the dwell period is determined by the experience of the past wiping cycle. In this system, the capacitor is conditioned while exiting the θ region: if the glass was wet and the system slides far into the θ region, the amount of θ region to be traversed upon exiting is correspondingly small and since conditioning occurs upon exiting, the charge on the capacitor will be small and the next dwell period will be short; if the glass was dry and the system slides, only a short distance into the θ region, the amount of θ region to be traversed during exiting is large, and the amount of conditioning will be large, the charge stored will be large and the next dwell period will be long. Since the timing capacitor is fully charged (to the desired degree, that is) and then is effectively open circuited, the base current into transistor 20 during the wiping cycle is not influenced by the charging of the timing capacitor.

The system of FIG. 9 is a modification of the system of FIG. 5 and the components in the system of FIG. 9 corresponding to those of FIG. 5 have been given the same reference numbers. In the system of FIG. 9, the potentiometer 96 and the resistor 94 have been eliminated and, instead, the junction between the resistor 23 and the diode 22 are connected through a series circuit of a resistor 32 and the variable resistor 130 to the brush 13. The resistor 97 is connected directly between the diode 98 and the junction between the resistors 23 and 24. The diode 26 and the resistor 112 of the system of FIG. 5 have been eliminated. Instead, the junction between the resistors 23 and 24 is connected through a switch 112 operated by the washer pushbutton to the collector of a transistor 170, the emitter of which is connected to the brush 11 of the motor 10 and the collector of which is connected through the resistor 172 to the junction between the resistor 111 and the capacitor 110. The brush 11 of the motor 10 is also connected through a resistor 171 to the base of the transistor 170, which is also connected through a resistor 163 to the collector of a transistor 160. The base of the transistor 160 is connected through a resistor 162 to the junction between resistors 23 and 24. A diode 161 is connected in series with the resistor 111 between the pole 53 of the motor-driven switch 50 and the capacitor 110. The emitter of the transistor 160 is connected to the junction between the diode 161 and the resistor 111. The washer system motor 120 is connected in a separate circuit in series with a switch 112a operated by the washer button between B+ and ground.

In the system of FIG. 9, the switch pole 53 contacts ground through contact 52 both during entrance and exiting from the θ region. However, the voltage at the junction of resistors 24 and 23 is negative upon entrance and positive upon exiting. Accordingly, transistor 160 and transistor 170 conduct when pole 53 is at ground potential and the junction between resistors 24 and 23 is positive. Upon exiting the θ region, timing capacitor charging current enters capacitor 110 through resistor 172. Upon exiting the θ region, diode 161 and the base emitter junction of transistor 160 are backbiased so that charging current is cut off except for leakage current through resistor 172. The leakage current is small enough compared to the charging current to have negligible effect on the time costant. During the wiping cycle, the motor speed is controlled as described in the circuit of FIG. 7a. Upon re-entering the θ region, the park switch pole 53 contacts ground and the leakage current through resistances 172 and 111 is sufficient for the diode 161 to conduct establishing 0.7 volts on the side of the capacitor 110 connected to resistor 111. The voltage at the junction of resistors 24 and 23 becomes negative for the dwell period. Neutralizing current flows through the motor brushes 11 and 13, through potentiometer 130, resistor 32, resistor 23, diode 25 into capacitor 110. As the charge becomes neutralized, the junction again becomes positive resulting in a "soft" start during which the capacitor 110 is again charged through resistance 172.

When the WASH switch is activated, current from transistor 170 is conducted to the side of capacitor 110 connected to resistor 24 and into the base of transistor 20. When the WASH switch is released, this reverse charge keeps the base of transistor 20 positive through at least the next dwell location so the wipers are in continuous operation after the wash motor is deenergized.

Upon placing switch 100 in the OFF position, the wiping cycle in progress is continued. At the park location, the armature current is reversed being conducted through transistor 90, brush 12, the motor, armature, brush 11, and contact 103, switch pole 53 to ground. Upon the wiper blades reaching the depressed park position, the pole 53 becomes open circuited de-energizing the circuit except for the base circuit of transistor 90. However, Zener diode 98 blocks base current flow so the entire circuit is effectively de-energized.

Since the moisture variable dwell time is dependent upon the amount of conditioning of capacitor 110 during exiting from the θ region, there is no need for a wiper position dependent variable resistance in the system of FIG. 9 and moisture sensitivity can be achieved without modifying the windshield wiper motor.

The system of FIG. 9 may employ a wiper dependent variable resistance in the RC timing circuit, in addition to conditioning the capacitor during exiting from the θ region, by using the thin film resistance 107 on the output gear of the motor as described above in connection with FIG. 6a. When the wiper dependent variable resistance is used with the system of FIG. 9, the brushes 107 are connected to the opposite sides of the variable resistance 130 so that the thin film resistance 107 varying with the degree of dryness of the windshield shunts the resistance 130. With this arrangement, the dwell period varies with the charge on the capacitor determined by the length of time the motor-driven switch 50 remains in the θ region at the start of the preceding wipe cycle as well as upon the value provided by the thin film resistance 107 determined by how far the wiper blades slide into the θ region. Thus, the dwell period is determined in part by the dryness of the windshield at the end of the immediately preceding wipe cycle and, in part, by the dryness of the windshield at the end of the penultimate wiping cycle. By making the system depend upon the degree of dryness in two wipe cycles, the system is made less subject to erratic variation in the dwell period due to instantaneous variations in the windshield dryness. Yet, the system is, overall, made more sensitive to moisture conditions since it is changing both the charge on the capacitor and the resistance in the RC timing circuit in response to the degree of dryness of the windshield.

It is to be understood that the above detailed description of the present invention is intended to disclose embodiments thereof to those skilled in the art, but that the invention is not to be construed as limited in its application to the details of construction and arrangements of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

I claim:

1. In an intermittent windshield wiper system comprising a motor connected to drive a windshield wiper through repeating wiping cycles over a windshield, each wiping cycle including an upstroke at the start of the wiping cycle and down stroke at the end of the wiping cycle, an amplifying device, switch means driven by said motor having a RUN position and a DWELL position and moving to said DWELL position at the end of each wiping cycle, and circuit means responsive to said switch means to cause said amplifying device to energize said motor intermittently to cause said wiper to stop for dwell periods at the ends of successive wiping cycles; the improvement wherein said circuit means includes speed regulating means responsive to the speed of said motor to apply a signal to the input of said amplifying device to cause said amplifying device to energize said motor with continuous current controlled to regulate the speed of said motor during the downstrokes of said wiping cycles.

2. In an intermittent windshield wiper system as recited in claim 1, wherein said circuit means causes the time between wiping cycles to vary in accordance with the degree of dryness on said windshield.

3. In an intermittent windshield wiper system as recited in claim 1, wherein said switch means remains in said DWELL position for a region of travel of said motor until after the start of the next wiping cycle and then switches to said RUN position, said circuit means varying the length of said dwell period in accordance with the length of time that said motor-driven switch remains in said DWELL position after the start of the preceding wiping cycle.

4. In an intermittent windshield wiper system as recited in claim 1, wherein said motor is a three brush motor, said amplifying device energizes the armature of said motor between a first brush and third brush of said motor, and said speed regulating means includes a circuit for applying a signal derived from a second brush of said motor to the input of said amplifying device.

5. In an intermittent windshield wiper system as recited in claim 4, wherein said circuit means connects said amplifying device to said third brush and includes a circuit for applying a signal derived from said third brush to the input of said amplifying device.

6. In an intermittent windshield wiper system as recited in claim 5, wherein said last named circuit comprises a variable resistance connected between said third brush and the input of said amplifying device.

7. In an intermittent windshield wiper system as recited in claim 5, wherein said circuit for applying a signal from said second brush comprises a resistance connected between the input of said amplifier and said second brush.

8. In an intermittent windshield wiper system as recited in claim 1, wherein said circuit means energizes said motor to cause said wiper to stop for a dwell period with said switch means in said dwell position at the end of each wiping cycle or to skip the dwell period at the end of each wiping cycle depending on the degree of dryness of said windshield.

9. In an intermittent windshield wiper system as recited in claim 8, wherein said circuit means includes manual control means to vary the speed at which said motor is regulated during the down strokes of said wiping cycles to thereby vary the threshhold point at which said motor will skip or not skip a dwell period at the end of each wiping cycle.

10. In an intermittent windshield wiper system as recited in claim 1, wherein said circuit means causes said amplifier to energize said motor gradually with a sloped waveform current at the start of each wiping cycle.

11. In an intermittent windshield wiper system as recited in claim 1, wherein said circuit means includes manual control means operable over a continuous range to vary the length of said dwell period from a maximum value at one end of said range to zero dwell period intermediate the ends of said range with the speed of the motor being increased from the point of zero dwell period intermediate the ends of said range to the other end of said continuous range.

12. In an intermittent windshield wiper system as recited in claim 11, wherein said manual control means increases the speed of said motor from one end of said range to the other end of said range.

13. In an intermittent windshield wiper system as recited in claim 1, wherein said circuit means causes said amplifier to run at an unregulated speed during the upstrokes of said wiping cycles and said speed regulating means causes said amplifying device to energize said motor with continuous current controlled to regulate said motor during the down strokes of said wiping cycle at a speed lower than the unregulated speed of said motor during the up strokes of said cycle.

14. In an intermittent windshield wiper system as recited in claim 1, wherein said circuit means causes the time of the dwell period between wiping cycles to vary in part in accordance with the degree of dryness of the windshield in the wiping cycle immediately preceding the dwell period and to vary in part in accordance with the degree of dryness of the windshield in the penultimate wiping cycle before the dwell period.

15. A motor speed control system comprising a three-brush motor having first, second and third brushes, an amplifying device having output electrodes connected to said third brush in a circuit to control the energization of said motor between said first brush and said third brush and having an input electrode, said amplifying device controlling the current flow from its output electrodes in accordance with the signal applied to said input electrode, means to apply a signal derived from said second brush to said input electrode to regulate the speed of said motor and means to apply a signal derived from said third brush to said input signal to regulate the speed of said motor.

16. A motor speed control system as recited in claim 15, wherein said means to apply a signal derived from said second brush comprises a resistance connected between said second brush and said control electrode and said means to apply a signal derived from said third brush comprises a resistance connected between said third brush and said control electrode.

17. A motor speed control system as recited in claim 16, wherein said resistance connected between said third brush and said control electrode is a variable resistance.

18. A motor speed control system as recited in claim 15, wherein said amplifying device comprises a field-effect transistor.

19. A motor speed control system as recited in claim 18, wherein said field-effect transistor has a first gate comprising said control electrode and has a second gate, and means to apply an independently variable signal to said second gate to provide a coarse control over the regulated speed of said motor.

20. In an intermittent windshield wiper system having an electric motor for driving a windshield wiper through repeating wiping cycles, manual control means having an ON position and an OFF position, and circuit means for energizing said motor to drive said wipers intermittently, stopping for dwell periods at the ends of successive wiping cycles when said manual control means is in said ON position, and for driving the wiper means to complete a wiping cycle during which said manual control means is switched to said OFF position, and automatically reversing the direction of current through the electric motor at the end of the last wiping cycle to drive the wiper to a depressed park position, the improvement wherein said circuit means includes a current path connected across the armature of said motor, control means for closing said current path at the ends of successive wiping cycles to electrodynamically brake said motor to a stop at the ends of such successive wiping cycles and to open said switch means before the end of said dwell period when said manual control means is in said ON position, said control means connecting said armature in series with said current path to cause current flow through said armature in the reverse direction at the end of said last wiping cycle during which said manual control means is switched to said OFF position to drive said wiper to said depressed park position.

21. In an intermittent windshield wiper system as recited in claim 20, wherein said circuit means includes switch means driven by said motor having a run position and a dwell position and being moved to said dwell position when said motor reaches the end of a wiping cycle, said control means connecting said switch means in series with said current path when said manual control means is in said OFF position and said switch means is in said dwell position, said switch means opening said current path when said wiper reaches said depressed park position.

22. In an intermittent windshield wiper system as recited in claim 21, wherein said switch means has a movable pole engaging a first contact in said RUN position and engaging a second contact in said DWELL position and engaging neither said first contact nor said second contact when said wiper reaches said depressed park position.

23. In an intermittent windshield wiper system as recited in claim 22, wherein said circuit means includes means to energize said motor in the forward direction when said wiper is in said depressed park position in response to said manual control means being moved to said ON position, said switch means maintaining said movable contact disengaged from said first and second contacts when said motor is energized with said wiper in said depressed park position until said motor has driven said wiper from said depressed park position past the position of said wiper at the end of each wiping cycle.

* * * * *